(12) United States Patent
Carames et al.

(10) Patent No.: US 11,665,097 B2
(45) Date of Patent: May 30, 2023

(54) METHODS AND SYSTEMS FOR DIFFERENTIATING MEC FLOWS USING IP HEADER SIGNALING

(71) Applicant: Verizon Patent and Licensing Inc., Basking Ridge, NJ (US)

(72) Inventors: Miguel A. Carames, Long Valley, NJ (US); Jignesh S. Panchal, Hillsborough, NJ (US); Ratul K. Guha, Warwick, PA (US); Maqbool Chauhan, Keller, TX (US); Parry Cornell Booker, Arlington, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 15 days.

(21) Appl. No.: 17/241,145

(22) Filed: Apr. 27, 2021

(65) Prior Publication Data

US 2022/0345410 A1 Oct. 27, 2022

(51) Int. Cl.
*H04L 47/24* (2022.01)
*H04W 28/06* (2009.01)
*H04L 45/745* (2022.01)
*H04L 61/5007* (2022.01)

(52) U.S. Cl.
CPC ............ *H04L 47/24* (2013.01); *H04L 45/745* (2013.01); *H04L 61/5007* (2022.05); *H04W 28/06* (2013.01)

(58) Field of Classification Search
CPC ... H04L 47/24; H04L 61/5007; H04L 45/745; H04W 28/06
See application file for complete search history.

(56) References Cited

U.S. PATENT DOCUMENTS

| | | | |
|---|---|---|---|
| 11,246,055 B1* | 2/2022 | Lu | H04W 24/02 |
| 2012/0096193 A1* | 4/2012 | Anzai | H04L 12/413 |
| | | | 710/20 |
| 2014/0313283 A1* | 10/2014 | Kato | G06F 3/1454 |
| | | | 348/14.12 |
| 2018/0071610 A1* | 3/2018 | Miller | G09B 5/065 |
| 2019/0020657 A1* | 1/2019 | Egner | H04W 12/009 |
| 2019/0097973 A1* | 3/2019 | Adler | H04L 63/1425 |
| 2019/0132251 A1* | 5/2019 | Dao | H04W 28/0231 |
| 2020/0137560 A1* | 4/2020 | Agarwal | H04L 61/103 |
| 2020/0169610 A1* | 5/2020 | Wang | H04W 4/60 |
| 2020/0329008 A1* | 10/2020 | Dao | G06F 16/953 |
| 2020/0389531 A1* | 12/2020 | Lee | H04L 67/561 |
| 2021/0022043 A1* | 1/2021 | Soryal | H04L 63/0876 |
| 2021/0076250 A1* | 3/2021 | Wang | H04W 28/0221 |
| 2021/0092069 A1* | 3/2021 | Musleh | H04L 45/08 |
| 2021/0105624 A1* | 4/2021 | Sardesai | H04W 12/088 |
| 2021/0243232 A1* | 8/2021 | Verma | H04L 63/1408 |
| 2021/0266870 A1* | 8/2021 | Bhandari | H04W 72/04 |

(Continued)

*Primary Examiner* — Christopher M Crutchfield
*Assistant Examiner* — Tito Q Pham

(57) ABSTRACT

Systems and methods described include receiving traffic associated with a multi-access edge computing (MEC) application hosted at a MEC network; determining an Internet Protocol (IP) address associated with the MEC application, wherein the IP address indicates a priority of the traffic associated with the MEC application; modifying a header of the traffic to include the IP address associated with the MEC application; transmitting the traffic to a wireless station; and routing the traffic based on the priority associated with the MEC application.

20 Claims, 5 Drawing Sheets

(56) References Cited

U.S. PATENT DOCUMENTS

| | | | |
|---|---|---|---|
| 2021/0306372 A1* | 9/2021 | Koral | G16Y 30/10 |
| 2021/0400768 A1* | 12/2021 | Chauhan | H04L 61/2514 |
| 2022/0021920 A1* | 1/2022 | Tsilimantos | H04N 21/2662 |
| 2022/0166776 A1* | 5/2022 | Lee | H04L 63/0884 |
| 2022/0174032 A1* | 6/2022 | Zhu | H04L 45/121 |
| 2022/0182358 A1* | 6/2022 | Xiong | H04L 61/2535 |
| 2022/0201597 A1* | 6/2022 | Kim | H04L 61/4511 |
| 2022/0256361 A1* | 8/2022 | Soma | H04L 49/90 |
| 2022/0329649 A1* | 10/2022 | Feng | H04L 67/60 |

* cited by examiner

METHODS AND SYSTEMS FOR DIFFERENTIATING MEC FLOWS USING IP HEADER SIGNALING

BACKGROUND

Multi-access Edge Computing (MEC) is becoming an increasingly important technology for mobile operators. In a MEC environment, core network capabilities (e.g., computational, storage, etc.) are situated at the network edge to improve latency and reduce traffic. Typically, MEC and non-MEC traffic are routed using the same access point name (APN) and all traffic using the same APN is assigned a given quality of service. However, in some situations, a differentiated treatment should be applied to the MEC traffic.

DETAILED DESCRIPTION OF EXAMPLE EMBODIMENTS

Figure 1:
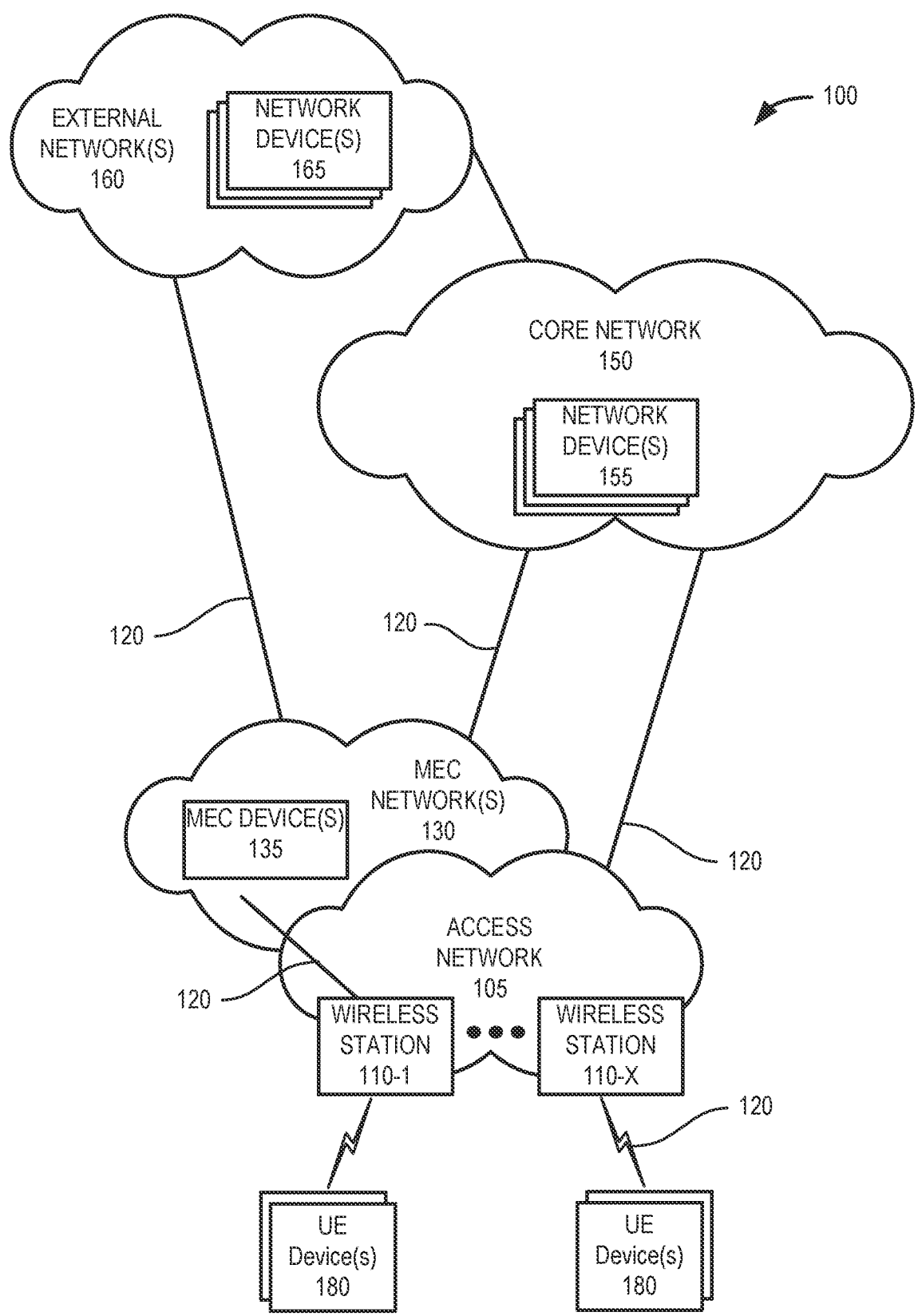
FIG. 1 illustrates an exemplary environment in which an exemplary embodiment of a MEC flow differentiation service may be implemented.

The following detailed description refers to the accompanying drawings. The same reference numbers in different drawings may identify the same or similar elements. Also, the following detailed description does not limit the invention.

New broadband cellular networks offer new features and benefits, such as high bandwidth, low latency, and support for massive Internet of Things (IoT) data transfers. One enhancement made possible through these new networks is the use of Multi-access Edge Computing (MEC) servers. These edge servers allow high network computing loads to be transferred onto the edge servers. Depending on the location of the edge servers relative to the point of attachment (e.g., a wireless station for an end device), MEC servers may provide various services and applications to end devices with minimal latency.

The use of MEC networks may require that access to low latency services be available to users who subscribe to the low latency services and to applications that will be run using the low latency services. In order to take advantage of MEC services, access to low latency services for a particular application, by a particular user, and in a particular geographical location should be seamless and immediate. For example, the user should be able to download and install the application on a user device and/or run the application that is already installed on a user device quickly and from any geographical environment.

Third Generation (3G), Fourth Generation (4G), and Fifth Generation (5G) Non-Standalone (NSA) networks may provide certain traffic segmentation capabilities, such as using Access Point Names (APNs) to determine a type of network connection to make, routing on the SGi interface based on source/destination Internet Protocol (IP) address, etc. However, the use of different APNs for different applications may require complex workflows (e.g., over-the-air device management or Open Mobile Alliance device management (OMA-DM)) and software updates at a user device that cannot occur in real time. Therefore, MEC and non-MEC traffic may be routed using the same APN (e.g., general purpose Internet access).

The routing of traffic to a MEC network or a non-MEC network may occur prior to the traffic arriving at a Packet Data Network Gateway (PGW) and, therefore, the MEC traffic and non-MEC traffic may be transported on the same bearer. A packet data network (PDN) maps to a bearer and all traffic on the bearer may be assigned the same quality of service (QoS) (e.g., QoS Class Identifier (QCI)). The QoS may dictate how the traffic is handled for the bearer. For example, the QoS may determine a user-plane prioritization in the core (PGW/Serving Gateway (SGW)) Transport Network, and Radio Access Network (RAN). Different configurations may be applied to various layers for MEC users, such as Connected Mode Discontinuous Reception (CDRX), Radio Link Control (RLC) (e.g., Unacknowledged Mode (UM)/Acknowledged Mode (AM)), packet data convergence protocol (PDCP) discard timers, RAN Media Access Control (MAC) scheduler prioritization, and different treatments may be applied to flows over the transport network by mapping to different Differentiated Services Code Point (DSCP)/Class of Service (CoS) (Pbits).

Ensuring MEC traffic receives consistent latency, jitter, and other characteristics associated with MEC computing may require certain treatment by the wireless core and RAN. Existing methods may enable differentiated routing at the IP layer, but may not provide enough information for the wireless core and wireless RAN to identify MEC traffic and potentially apply differentiated treatment. Mobile network operators may have several options to apply differentiated treatment to MEC traffic. For example, mobile network operators may treat all traffic as MEC traffic for a given subscriber, which may be expensive and inefficient. As another example, mobile network operators may separate MEC traffic to a different APN, which may be complex and cumbersome and may be dependent on a user device's capabilities.

According to implementations described herein, an intra-QoS flow differentiated service is provided. MEC flows may be identified and given different treatment than non-MEC flows. In one implementation, a user device may request services from a MEC application at a MEC network and the MEC application may transmit data toward the user device. The core network may receive the traffic and may determine that the traffic is associated with a MEC application. A priority associated with the MEC application traffic may be determined based on the Internet Protocol (IP) address of the MEC application. In order to convey the MEC application priority, for example, the IPv6 header may be modified based on the priority assigned to the MEC application traffic. The IP header may be communicated to the RAN. Based on receiving the IP header, the RAN may differentiate the MEC traffic from other traffic and may schedule the MEC traffic based on the priority indicated by the IP header, as described below.

FIG. 1 illustrates an exemplary environment 100 in which an embodiment of the MEC flow differentiation service may be implemented. As illustrated, environment 100 includes an access network 105, a MEC network 130, a core network 150, and an external network 160. Access network 105 may include wireless stations 110-1 through 110-X (referred to collectively as wireless stations 110 and generally as wireless station 110). MEC network 130 may include MEC devices 135; core network 150 may include network devices 155; and external network 160 may include network devices 165. Environment 100 further includes one or more end user devices 180, also referred to as user equipment (UE) devices 180.

The number, the type, and the arrangement of network device and the number of user devices 180 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links 120 between the networks, between the network devices, and between user devices 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fourth Generation (4G) RAN, a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or core network 150.

Depending on the implementation, access network 105 may include one or multiple types of wireless stations 110. For example, wireless station 110 may include a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. Wireless stations 110 may connect to MEC network 130 via backhaul links 120, such as wired or optical links. According to various embodiments, access network 105 may be implemented according to various architectures of wireless service, such as, for example, macrocell, microcell, femtocell, or other configuration. Additionally, according to various exemplary embodiments, access network 105 may be implemented according to various wireless technologies (e.g., radio access technology (RAT), etc.), wireless standards, wireless frequencies/bands, and so forth.

MEC network 130 includes a platform that provides services at the edge of a network, such as access network 105. MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.).

For purposes of illustration and description, MEC devices 135 may include the various types of network devices that may be resident in MEC network 130. MEC devices 135 may be located to provide geographic proximity to various groups of wireless stations 110. According to implementations described herein, some MEC devices 135 may store a list of applications hosted at MEC network 130 and IP addresses associated with the applications.

Core network 150 may include one or multiple networks of one or multiple network types and technologies to support access network 105. For example, core network 150 may be implemented to include a next generation core (NGC) network for a 5G network, an Evolved Packet Core (EPC) of an LTE network, an LTE-A network, an LTE-A Pro network, and/or a legacy core network.

Depending on the implementation, core network 150 may include various network elements that may be implemented in network devices 155. Such network elements may include a mobility and management entity (MME), a user plane function (UPF), a session management function (SMF), a core access and mobility management function (AMF), a unified data management (UDM), a PDN gateway (PGW), a serving gateway (SGW), a policy charging rules function (PCRF), a policy function (PCF), a policy control, a home subscriber server (HSS), as well other network elements pertaining to various network-related functions, such as billing, security, authentication and authorization, network polices, subscriber profiles, network slicing, and/or other network elements that facilitate the operation of core network 150. In the context of a core network that is configured to support 5G UE devices 180, core network 150 may include one or more network devices 155 with combined 4G and 5G functionality, such as a session management function with PDN gateway-control plane (SMF+PGW-C) and a user plane function with PDN gateway-user plane (UPF+PGW-U).

External network 160 may include one or multiple networks. For example, external network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts an end device application or service (e.g., an application or service for UE device 180). For example, the end device application/service network may provide various applications or services pertaining to broadband access in dense areas (e.g., pervasive video, smart office, operator cloud services, video/photo sharing, etc.), broadband access everywhere (e.g., 50/100 megabits per second (Mbps), ultralow-cost network, etc.), higher user mobility (e.g., high speed train, remote computing, moving hot spots, etc.), Internet of Things (IoTs) (e.g., smart wearables, sensors, mobile video surveillance, etc.), extreme real-time communications (e.g., tactile Internet, etc.), lifeline communications (e.g., natural disaster, etc.), ultra-reliable communications (e.g., automated traffic control and driving, collaborative robots, health-related services (e.g., monitoring, remote surgery, etc.), drone delivery, public safety, etc.), and/or broadcast-like services. Depending on the implementation, external network 160 may include various network devices 165 that provide various applications, services, or other type of end device assets, such as servers (e.g., web, application, cloud, etc.), mass storage devices, data center devices, and/or other types of network devices pertaining to various network-related functions.

User device 180 includes a device that has computational and wireless communication capabilities. User device 180 may be implemented as a mobile device, a portable device, a stationary device, a device operated by a user, or a device not operated by a user. For example, user device 180 may be implemented as a Mobile Broadband device, a smartphone, a computer, a tablet, a netbook, a wearable device, a vehicle support system, a game system, a drone, an IoT device, a machine type communication (MTC) device, or some other type of wireless device. According to various exemplary embodiments, User device 180 may be configured to execute various types of software (e.g., applications, programs, etc.). User device 180 may support one or multiple RATs (e.g., 4G, 5G, etc.), one or multiple frequency bands, network slicing, dual-connectivity, and so forth. Additionally, user device 180 may include one or multiple communication interfaces that provide one or multiple (e.g., simultaneous or non-simultaneous) connections via the same or different RATs, frequency bands, etc.

Figure 2:
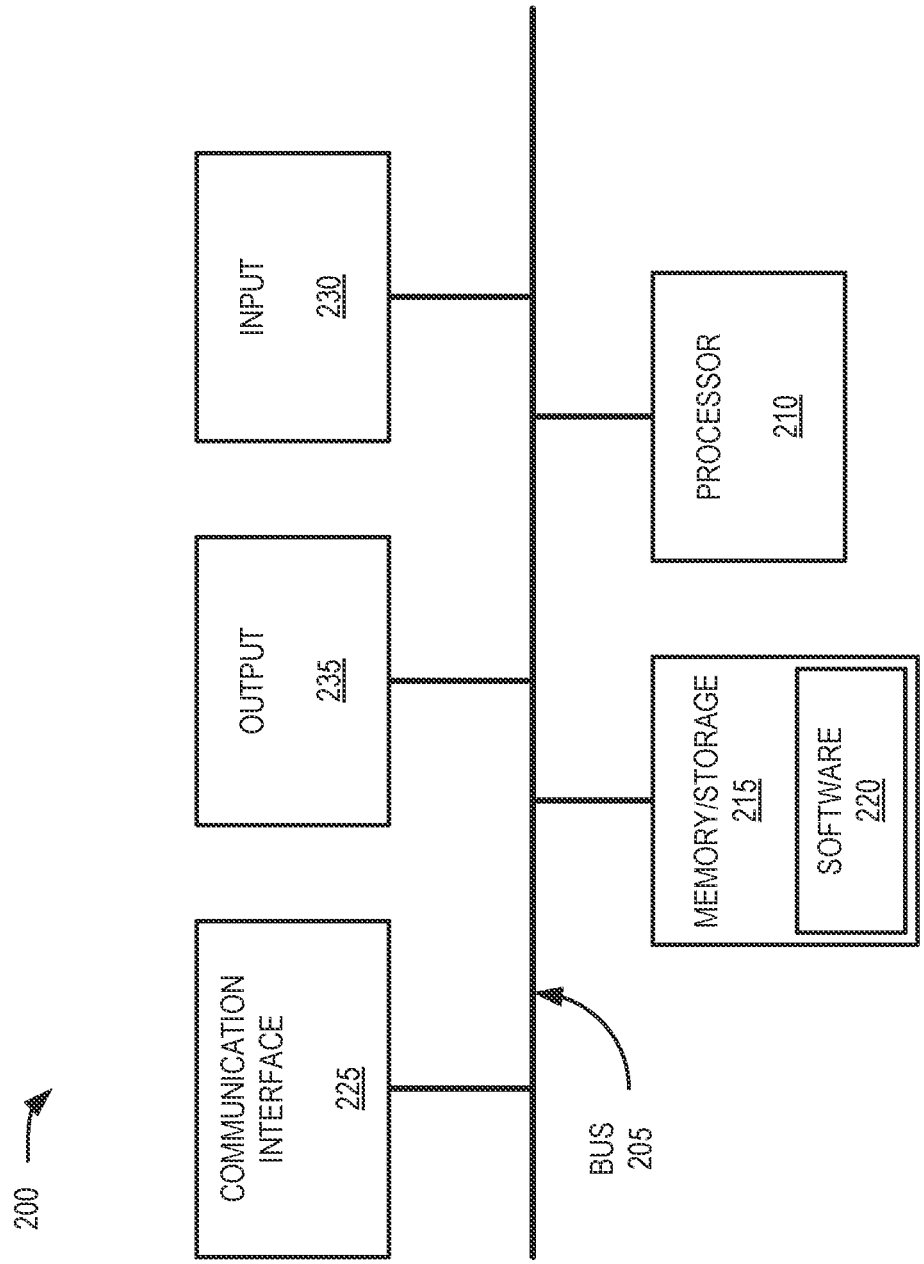
FIG. 2 illustrates exemplary components of a device that may correspond to one or more of the devices illustrated and described herein.

FIG. 2 is a diagram illustrating example components of a device 200 according to an implementation described herein. Device 200 may be implemented in, for example, wireless station 110, MEC device 135, network device 155, network device 165, and/or UE device 180. In another implementation, device 200 may include multiple network functions. As illustrated in FIG. 2, according to an exemplary embodiment, device 200 includes a bus 205, a processor 210, a memory/storage 215 that stores software 220, a communication interface 225, an input 230, and an output 235. According to other embodiments, device 200 may include fewer components, additional components, different components, and/or a different arrangement of components than those illustrated in FIG. 2 and described herein.

Bus 205 includes a path that permits communication among the components of device 200. For example, bus 205 may include a system bus, an address bus, a data bus, and/or a control bus. Bus 205 may also include bus drivers, bus arbiters, bus interfaces, and/or clocks.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc. Processor 210 may be a dedicated component or a non-dedicated component (e.g., a shared resource).

Processor 210 may control the overall operation or a portion of operation(s) performed by device 200. Processor 210 may perform one or multiple operations based on an operating system and/or various applications or computer programs (e.g., software 220). Processor 210 may access instructions from memory/storage 215, from other components of device 200, and/or from a source external to device 200 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include a drive for reading from and writing to the storage medium.

Memory/storage 215 may be external to and/or removable from device 200, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 may include an operating system. Software 220 is also intended to include firmware, middleware, microcode, hardware description language (HDL), and/or other forms of instruction.

Communication interface 225 permits device 200 to communicate with other devices, networks, systems, devices, and/or the like. Communication interface 225 includes one or multiple wireless interfaces and/or wired interfaces. For example, communication interface 225 may include one or multiple radio frequency (RF) transmitters and receivers, or transceivers. Communication interface 225 may include one or more antennas. For example, communication interface 225 may include an array of antennas. Communication interface 225 may operate according to a communication standard and/or protocols. Communication interface 225 may include various processing logic or circuitry (e.g., multiplexing/de-multiplexing, filtering, amplifying, converting, error correction, etc.).

Input 230 permits an input into device 200. For example, input 230 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 235 permits an output from device 200. For example, output 235 may include a speaker, a display, a light, an output port, and/or some other type of visual, auditory, tactile, etc., output component. According to some embodiments, input 230 and/or output 235 may be a device that is attachable to and removable from device 200.

Device 200 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, device 200 performs a process described herein based on the execution of hardware (processor 210, etc.).

Figure 3:
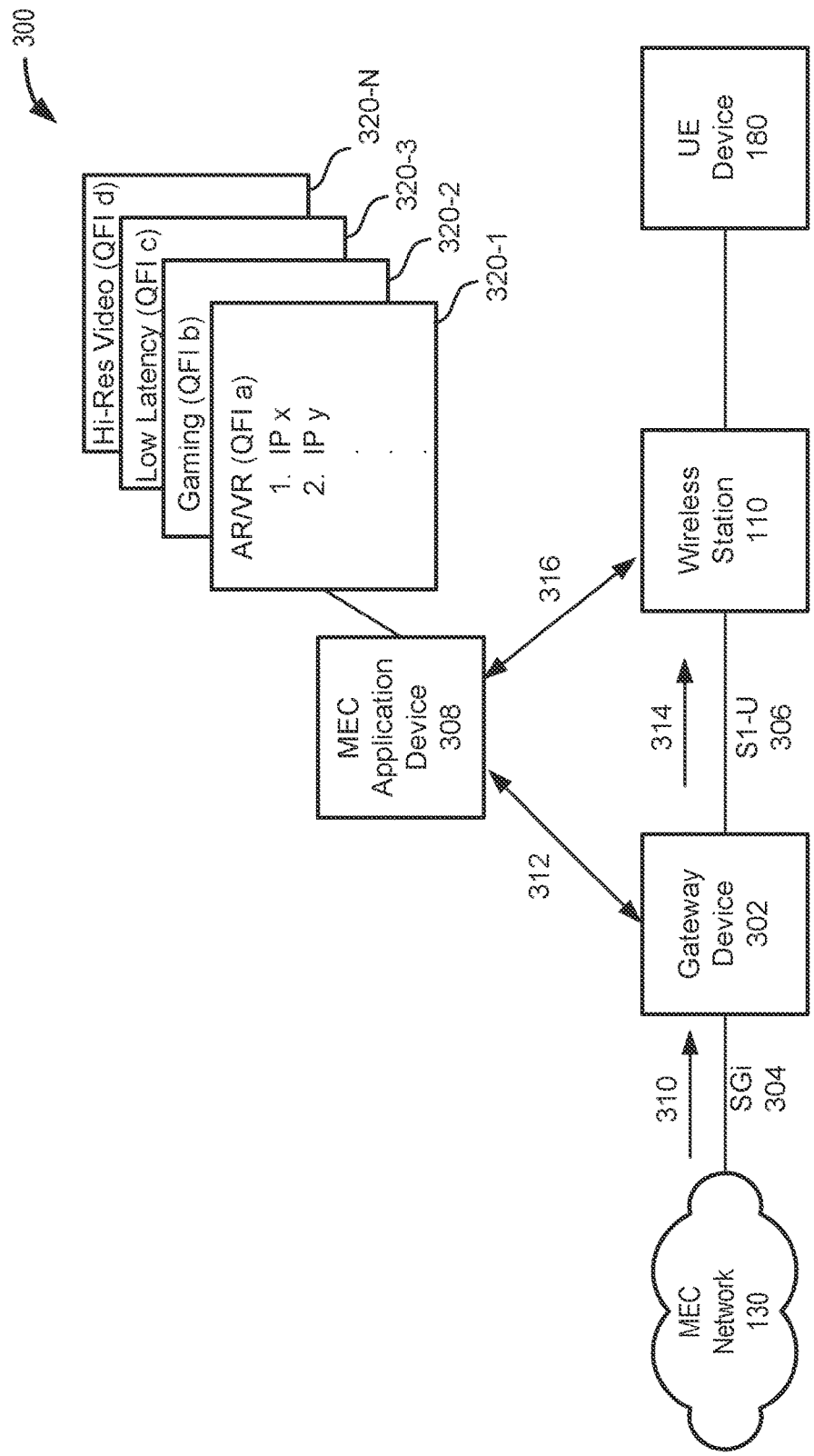
FIG. 3 illustrates exemplary components of an environment for performing MEC flow differentiation.

FIG. 3 is a diagram illustrating exemplary components of environment 300, which may be implemented in environment 100, for performing MEC flow differentiation. In one implementation, all or some of the components illustrated in FIG. 3 may be implemented by a processor (e.g. processor 210) executing software instructions stored in a memory (e.g., memory/storage 215). As shown in FIG. 3, environment 300 may include MEC network 130, SGi interface 304, gateway device 302, S1-U interface 306, MEC application device 308, wireless station 110, and UE device 180.

In the embodiment described in FIG. 3, UE device 180 may request services from MEC network 130. For example, UE device 180 may execute an application that transmits data to and receives data from an application hosted on MEC network 130. As shown in FIG. 3, in response to a service request from UE device 180, MEC network 130 and/or access network 105 (not shown in FIG. 3) may transmit traffic to gateway device 302 via SGi interface 304 (310). In one implementation, gateway device 302 may include a PGW and/or a SGW. In another implementation, such as a 5G implementation, gateway device 302 may include a UPF.

Gateway device 302 may receive the traffic from MEC network 130 and may determine that the traffic includes MEC traffic. For example, the traffic may include a source identifier (ID) associated with a MEC device 135 in MEC network 130 from which the traffic originates, an application ID associated with a MEC application associated with the traffic, and/or additional identifying information. Gateway device 302 may determine that traffic is MEC traffic based on the source IP address, the application ID associated with the traffic, an application type associated with the traffic, or other information associated with the traffic. Based on determining that the traffic is MEC traffic, gateway device 302 may communicate with MEC application device 308 and receive from MEC application device 308, an IP address associated with the MEC traffic. The IP address may include a modified header that will be used by devices in environment 300, such as UE device 180, wireless stations 110, gateway device 302 and MEC application device 308 to indicate that the traffic is MEC traffic and a priority associated with the particular MEC traffic.

As shown in FIG. 3, MEC application device 308 may store information associated with MEC application categories 320-1 to 320-N (referred to collectively as MEC application categories 320 and generally as MEC application category 320). MEC application device 308 may be located at MEC network 130 (e.g., in a MEC device 135), external network 160, or in another location. As shown in FIG. 3, MEC application categories 320 may include, for example, augmented reality (AR)/virtual reality (VR) application category 320-1, gaming application category 320-2, low latency application category 320-3, and high resolution (hi-res) video application category 320-N. As further shown in FIG. 3, each MEC application category 320 may be associated with a particular QoS flow identifier (QFI) that indicates a quality of service or priority associated with traffic in that category. As shown in FIG. 3, traffic associated with AR/VR MEC application category 320-1 may be associated with QFI a, traffic associated with gaming MEC applications 320-2 may be associated with QFI b, traffic associated with low latency MEC applications 320-3 may be associated with QFI c, and traffic associated with hi-res video MEC applications 320-N may be associated with QFI d.

MEC application device 308 may additionally store IP addresses associated with particular MEC applications within MEC application categories 320. For example, a first AR/VR MEC application may have a higher priority than a second AR/VR MEC application. As shown in FIG. 3, the first AR/VR MEC application may have an IP address of x and the second AR/VR MEC application may have an IP address of y. In this example, the first AR/VR application with QFI and an IP address x may have a higher priority across the network than the second AR/VR application with QFI a and IP address y.

As shown in FIG. 3, gateway device 302 may transmit information associated with the MEC traffic (e.g., source IP address, application ID, application type, etc.) to MEC application device 308 and MEC application device 308 may transmit the corresponding IP address to gateway device 302 (312). For example, if the MEC application associated with the MEC traffic is an AR/VR application and with the highest priority, MEC application device 308 may indicate that the IP address associated with the MEC traffic for the AR/VR application is x. Gateway device 302 may modify the extension header (e.g., IPv6 header) associated with the traffic to indicate the IP address (i.e., priority) associated with the MEC traffic (e.g., IP address x). Alternatively, MEC application device 308 may modify an IP extension header (e.g., an IPv6 header) with the IP address that will indicate the priority of the traffic for that particular application and forward the modified traffic to gateway device 302. Gateway device 302 may, in turn, utilize the IP header over the S1-U interface 306 to signal to the wireless station 110 that the traffic being carried is for a MEC application of a certain priority (314). Modifying the IP header with particular information may then be used to indicate the priority of the traffic, but may not change the routing of the traffic. That is, the IP source and destination addresses for the traffic remain unchanged.

Wireless station 110 may determine the priority associated with the traffic based on the IP address in the S1-U IP header. In one implementation, wireless station 110 may communicate with MEC application device 308 to determine the priority associated with the MEC traffic (316). For example, wireless station 110 may transmit the IP address of the MEC traffic to MEC application device 308 and may receive a QFI and the particular priority associated with the MEC application associated with the traffic. Wireless station 110 may map the priority information to a parameter relevant to the scheduler (e.g., subscriber profile ID (SPID), QCI, etc.) and route the traffic based on the SPID, QCI, etc. In this manner, the MEC traffic to and from UE device 180 may be routed differently than other network traffic (e.g., non-MEC traffic) and may be prioritized based on the particular MEC application being executed by UE device 180.

Figure 4:
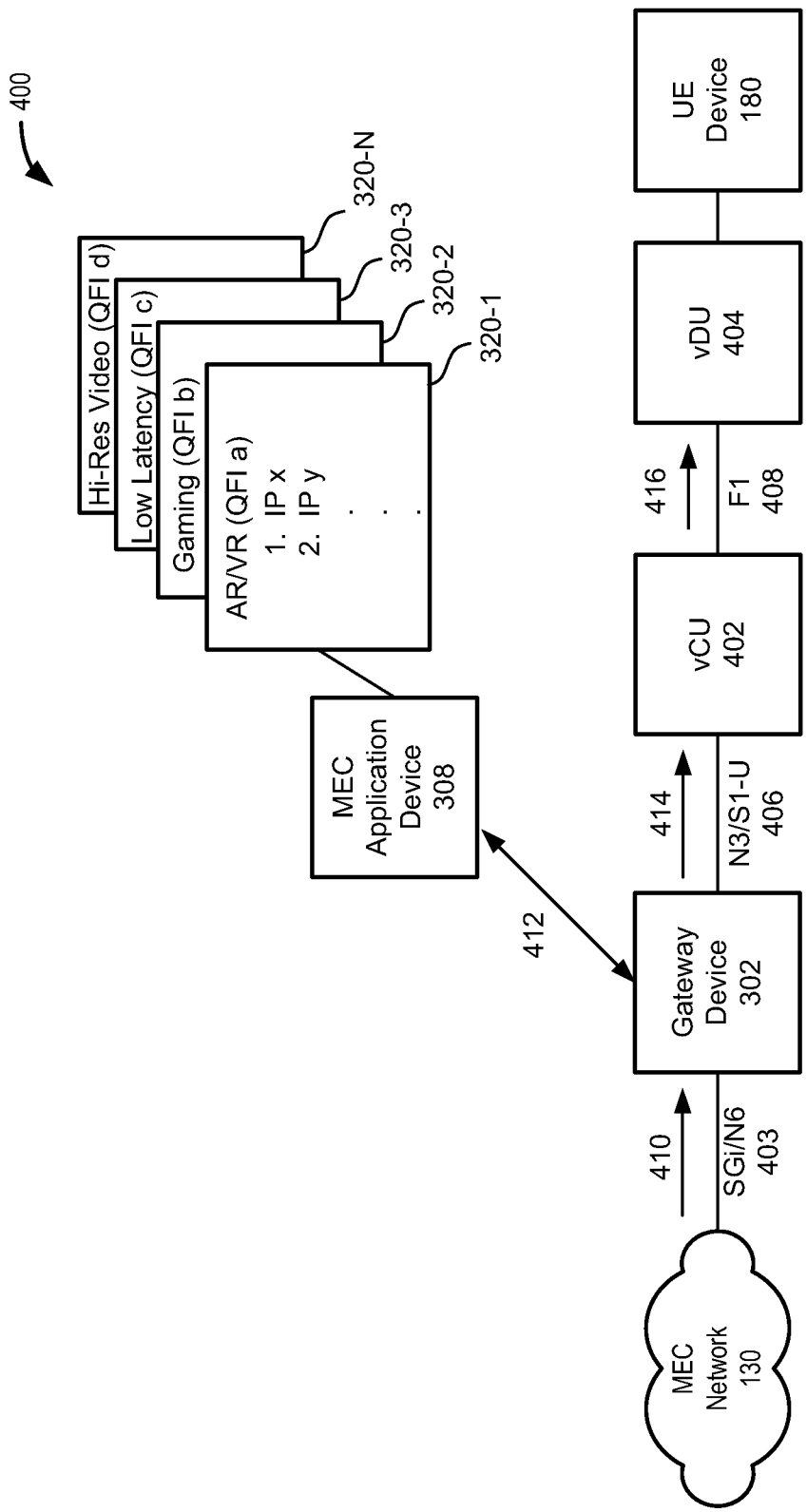
FIG. 4 illustrates exemplary components of another environment for performing MEC flow differentiation.

FIG. 4 is a diagram illustrating exemplary components of another environment 400, which may be implemented in environment 100, for performing MEC flow differentiation. Environment 400 may include MEC network 130, MEC application device 308, SGi/N6 interface 403, gateway device 302, N3/S1-U interface 406, virtualized central unit (vCU) 402, virtualized distributed unit (vDU) 404, F1 interface 408, and UE device 180. In the 5G network, the gNB may be composed of radio units (RUs), DUs, and CUs. When the DUs and CUs may be deployed as virtual network functions, the DUs and CUs may be denoted as vCUs and vDU and may be separated by an F1 interface.

In a similar manner to the process described above with respect to FIG. 3, UE device 180 may request services from MEC network 130 and, in response to a service request from UE device 180, MEC network 130 and/or access network 105 (not shown in FIG. 4) may transmit traffic to gateway device 302 via SGi/N6 interface 403 (410). Gateway device 302 may receive the traffic from MEC network 130 and determine that the traffic includes MEC traffic. Similar to the process described in FIG. 3, gateway device 302 may communicate with MEC application device 308 to determine an IP address associated with the MEC traffic (412) and modify an IP header of the packets of the MEC traffic to indicate a priority of the MEC traffic. MEC application device 308 may forward the IP header associated with the particular application to gateway device 302 (412).

As shown in FIG. 4, gateway device 302 may transmit the IP header conveying MEC traffic information to vCU 402 via N3/S1-U interface 406 (414). vCU 402 may transmit the MEC traffic with the IP address to vDU 404 via the F1 interface 408 (416). In one implementation, an intra QFI priority bit may be extracted/derived/mapped from the IP address by gateway device 302 prior to passing the MEC traffic via the F1 interface 408 to vCU 402 and may be repopulated at vDU 404. vDU 404 may determine the priority information associated with the MEC traffic based on the modified IP header and may treat the MEC traffic accordingly, e.g., schedule the MEC traffic associated with UE device 180 based on the priority information. For example, vDU 404 may route the MEC traffic in a different manner than other traffic (e.g., non-MEC traffic) is routed and may prioritize the MEC traffic based on the priority information included in the modified IP header.

Figure 5:
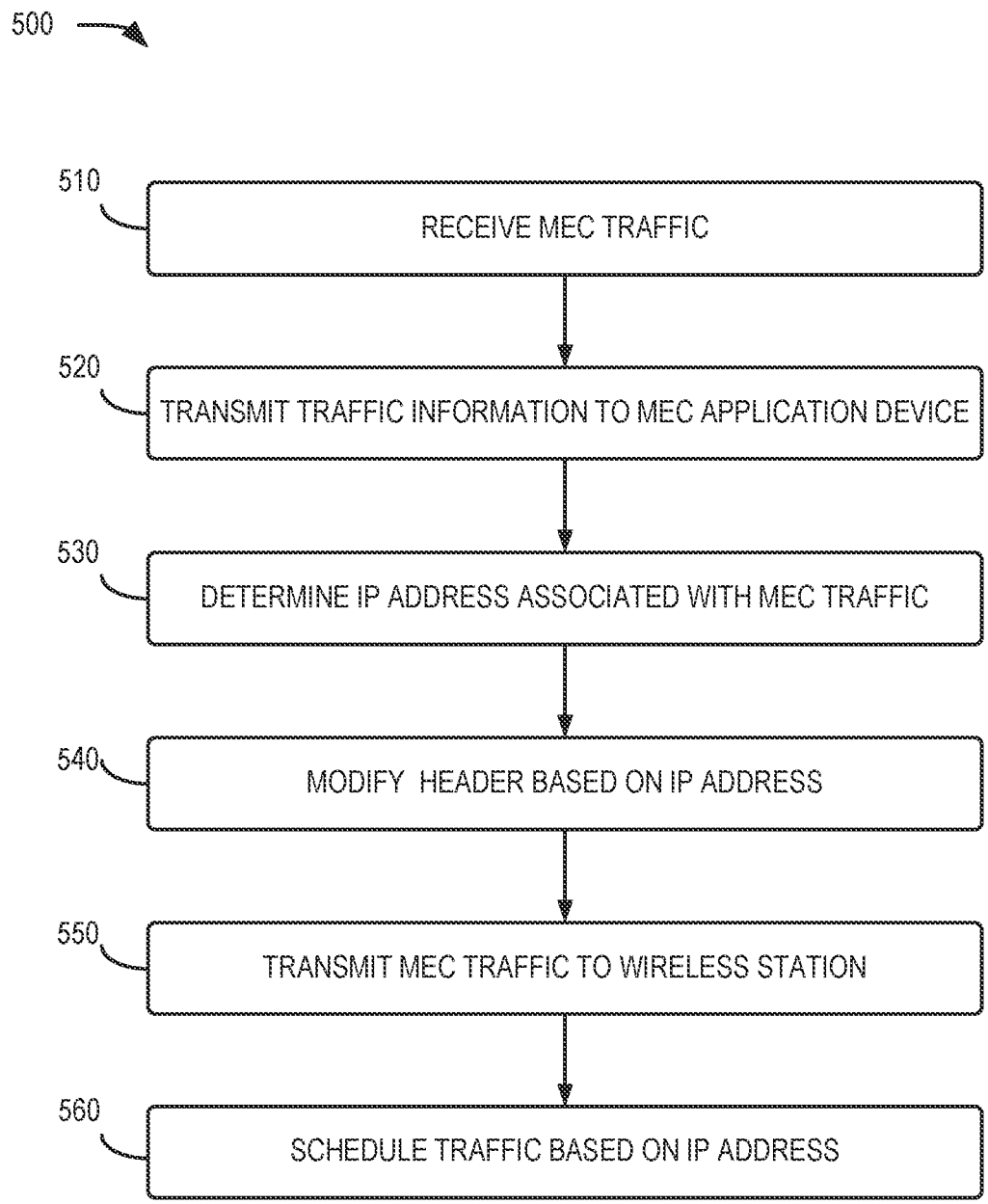
FIG. 5 is a flow diagram illustrating an exemplary process for performing MEC flow differentiation according to an implementation.

FIG. 5 is a flow diagram illustrating an exemplary process 500 for performing MEC flow differentiation. In one implementation, process 500 may be implemented by a combination of gateway device 302, MEC application device 308, wireless station 110, vCU 402, vDU 404, and/or one or more other devices in network environment 100.

As shown in FIG. 5, traffic may be received from MEC network 130 (block 510). For example, gateway device 302 may receive traffic originating from UE device 180 and/or destined for UE device 180 from MEC network 130. Gateway device 302 may transmit information associated with the traffic to MEC application device 308 (block 520). For example, gateway device 302 may transmit the source IP address, the application ID, the application type, and/or other information to MEC application device 308.

MEC application device 308 may determine an IP address associated with the traffic (block 530). For example, based on the IP address, application ID, application type or other information associated with the traffic, MEC application device 308 may perform a lookup to determine a QFI associated with a category 320 of the MEC application associated with the traffic and an IP address associated with the particular MEC application. MEC application device 308 may transmit the IP address to gateway device 302.

Gateway device 302 may receive the IP address and may modify an extension header (e.g., IPv6 header) associated with packets in the traffic associated with the MEC application to include the IP address (block 540). Alternatively, MEC application device 308 may modify the extension header (e.g., IPv6 header) with the IP address that will indicate the priority of the traffic for that particular MEC application. The IP address header may indicate a priority associated with the traffic, but may not modify a route associated with the traffic (i.e., IP addresses of the source and destination may remain unchanged). Gateway device 302 may transmit the traffic with the modified IP address to wireless station 110 (block 550). In one implementation, gateway device 302 may transmit the traffic to a gNB associated with UE device 180. In another implementation, gateway device 302 may transmit the traffic to an eNB associated with UE device 180. In yet another implementation, gateway device 302 may transmit the traffic to vCU 402, which may transmit the traffic to vDU 404.

Continuing with FIG. 5, the traffic may be scheduled and routed based on the information in the IP address (block 560). For example, wireless station 110 may map the S1-U IP address or IP Header including the particular priority information (e.g., modified IP address header) to a parameter relevant to a RAN scheduler and may schedule and transmit the traffic based on the parameter. In one implementation, wireless station 110 may map the IP address to the parameter based on information received from MEC application device 308, such as the particular priority level associated with the application. Wireless station 110 may determine a priority associated with the traffic based on the IP address and/or the parameter. In addition, wireless station 110 may route the traffic based on the traffic being MEC traffic. For example, MEC traffic from UE device 180 to MEC network 130 may be routed differently than traffic originating from UE device 180 and destined for external network 160. In addition, the priority for the MEC traffic from UE device 180 may be routed with a higher priority than MEC traffic from another application associated with the same category 320.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 5, and a series of communications have been described with regard to FIGS. 3 and 4, the order of the blocks and/or communications may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 210, etc.), or a combination of hardware and software (e.g., software 220).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 210) of a device. A non-transitory storage medium includes one or more of the storage mediums described in relation to memory/storage 215.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    receiving first traffic associated with a first multi-access edge computing (MEC) application, of a first MEC application category among multiple MEC application categories, hosted at a MEC network, wherein a user-plane prioritization is associated with each of the MEC application categories;
    determining an Internet Protocol (IP) address associated with the first MEC application, wherein the IP address indicates a first priority of the first traffic associated with the first MEC application, and wherein the first priority differs from a second priority of second traffic associated with a second MEC application of the first MEC application category which is hosted at the MEC network;
    modifying a header of the first traffic associated with the first MEC application to include the IP address associated with the first MEC application;
    transmitting the first traffic to a wireless station; and
    routing the first traffic based on the first priority included in the header.

2. The method of claim 1, wherein determining the IP address comprises:
    determining the IP address based on an application identifier associated with the first MEC application.

3. The method of claim 1, wherein determining the IP address comprises:
    determining the IP address based on the first MEC application category.

4. The method of claim 1, wherein determining the IP address comprises:
    performing a lookup based on the category of the first MEC application category to determine the IP address.

5. The method of claim 1, wherein routing the first traffic comprises:
    routing the first traffic based on a quality of service (QoS) flow identifier (QFI) or a Subscriber Profile ID (SPID) associated with the first traffic; and
    routing third traffic destined for a non-MEC network without modification of a packet header with respect to a destination IP address.

6. The method of claim 1, wherein the wireless station includes a virtualized central unit (vCU) and a virtualized distributed unit (vDU).

7. The method of claim 1, wherein the modifying the header comprises:
    modifying an IPv6 header without modifying a route of the first traffic.

8. A system comprising:
    one or more processors configured to:
        receive first traffic associated with a first multi-access edge computing (MEC) application, of a first MEC application category among multiple MEC application categories, hosted at a MEC network, wherein a user-plane prioritization is associated with each of the MEC application categories;
        determine an Internet Protocol (IP) address associated with the first MEC application, wherein the IP address indicates a first priority of the first traffic associated with the first MEC application, and wherein the first priority differs from a second priority of second traffic associated with a second MEC application of the first MEC application category which is hosted at the MEC network;
modify a header of the first traffic associated with the first MEC application to include the IP address associated with the first MEC application; and
schedule and route the first traffic based on the first priority included in the header.

9. The system of claim 8, wherein when determining the IP address, the one or more processors are further configured to determine the IP address based on an application identifier associated with the first MEC application.

10. The system of claim 8, wherein when determining the IP address, the one or more processors are further configured to determine the IP address based on the first MEC application category.

11. The system of claim 8, wherein when determining the IP address, the one or more processors are further configured to perform a lookup based on the first MEC application category to determine the IP address.

12. The system of claim 8, wherein when routing the first traffic, the one or more processors are further configured to:
route the first traffic based on a quality of service (QoS) flow identifier (QFI) or a Subscriber Profile ID (SPID) associated with the first traffic; and
route third traffic destined for a non-MEC network without modification of a packet header with respect to a destination IP address.

13. The system of claim 8, wherein the system includes a Packet Data Network Gateway (PGW) or a user plane function (UPF) device.

14. The system of claim 8, wherein when modifying the header, the one or more processors are configured to modify an IPv6 header without modifying a route of the first traffic.

15. A non-transitory, computer-readable storage medium storing instructions executable by one or more processors of one or more devices, which when executed cause the one or more devices to:
receive first traffic associated with a first multi-access edge computing (MEC) application, of a first MEC application category of multiple MEC application categories, hosted at a MEC network, wherein a user-plane prioritization is associated with each of the MEC application categories;
determine an Internet Protocol (IP) address associated with the first MEC application, wherein the IP address indicates a first priority of the first traffic associated with the first MEC application, and wherein the first priority differs from a second priority of second traffic associated with a second MEC application of the first MEC application category which is hosted at the MEC network;
modify a header of the first traffic associated with the first MEC application to include the IP address associated with the first MEC application; and
route the first traffic based on the first priority included in the header.

16. The non-transitory, computer-readable storage medium of claim 15, wherein the instructions executed to determine the IP address comprise instructions that cause the one or more devices to determine the IP address based on an application identifier associated with the first MEC application.

17. The non-transitory, computer-readable storage medium of claim 15, wherein the instructions executed to determine the IP address comprise instructions that cause the one or more devices to determine the IP address based on the first MEC application category.

18. The non-transitory, computer-readable storage medium of claim 15 wherein the instructions executed to determine the IP address comprise instructions that cause the one or more devices to perform a lookup based on the first MEC application category to determine the IP address.

19. The non-transitory, computer-readable storage medium of claim 15, wherein the instructions executed to route the first traffic include instructions that cause the one or more devices to:
route the first traffic based on a quality of service (QoS) flow identifier (QFI) associated with the first traffic; and
route third traffic destined for a non-MEC network without modification of a packet header with respect to a destination IP address.

20. The non-transitory, computer-readable storage medium of claim 15, wherein the one or more devices includes a Packet Data Network Gateway (PGW) or a user plane function (UPF) device.

* * * * *